United States Patent
Vougioukas et al.

(10) Patent No.: US 11,657,003 B2
(45) Date of Patent: May 23, 2023

(54) APPARATUS AND METHOD

(71) Applicant: Arm Limited, Cambridge (GB)

(72) Inventors: Ilias Vougioukas, Cambridge (GB); Nikos Nikoleris, London (GB); Andreas Lars Sandberg, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 134 days.

(21) Appl. No.: 16/778,040

(22) Filed: Jan. 31, 2020

(65) Prior Publication Data
US 2020/0293457 A1 Sep. 17, 2020

(30) Foreign Application Priority Data
Mar. 12, 2019 (EP) .................... 19386010

(51) Int. Cl.
| | | |
|---|---|---|
| *G06F 12/10* | (2016.01) | |
| *G06F 12/1036* | (2016.01) | |
| *G06F 12/1027* | (2016.01) | |
| *G06N 5/04* | (2023.01) | |
| *G06F 9/48* | (2006.01) | |

(52) U.S. Cl.
CPC ........ *G06F 12/1036* (2013.01); *G06F 9/4806* (2013.01); *G06F 12/1027* (2013.01); *G06N 5/04* (2013.01); *G06F 2212/681* (2013.01)

(58) Field of Classification Search
CPC ........... G06F 2212/682; G06F 12/1027; G06F 12/1036; G06F 12/1045; G06F 12/1054; G06F 12/1063; G06F 12/1072; G06F 2212/68; G06F 2212/681; G06F 2212/683; G06F 2212/684; G06F 9/4806; G06F 9/4856; G06F 9/4862; G06F 9/4875; G06F 9/5088; G06F 12/10
See application file for complete search history.

(56) References Cited

U.S. PATENT DOCUMENTS

| | | | |
|---|---|---|---|
| 6,356,989 B1 * | 3/2002 | Hays ................... | G06F 12/1027 711/205 |
| 9,081,706 B2 * | 7/2015 | Koka .................. | G06F 12/1027 |
| 2013/0173882 A1 * | 7/2013 | Bhowmik ........... | G06F 12/1036 711/207 |
| 2017/0177498 A1 * | 6/2017 | Wilkes ................ | G06F 12/1081 |

(Continued)

OTHER PUBLICATIONS

A Survey of Techniques for Architecting TLBs by Mittal (Year: 2016).*

(Continued)

*Primary Examiner* — Paul M Knight
(74) *Attorney, Agent, or Firm* — Nixon & Vanderhye P.C.

(57) ABSTRACT

Apparatus comprises two or more processing devices each having an associated translation lookaside buffer to store translation data defining address translations between virtual and physical memory addresses, each address translation being associated with a respective virtual address space; and control circuitry to control the transfer of at least a subset of the translation data from the translation lookaside buffer associated with a first processing device to the translation lookaside buffer associated with a second, different, processing device.

17 Claims, 4 Drawing Sheets

(56) References Cited

U.S. PATENT DOCUMENTS

2017/0371805 A1* 12/2017 Jayasena ............ G06F 12/1009

OTHER PUBLICATIONS

TLB Improvements for Chip Multiprocessors: Inter-Core Cooperative Prefetchers and Shared Last-Level TLBs by Lustig (Year: 2013).*

PS-TLB: Leveraging Page Classification Information for Fast, Scalable and Efficient Translation for Future CMPs by Li (Year: 2013).*

Analyzing and Optimizing TLB-Induced Thread Migration Costs on Linux/ARM by Landsberg (Year: 2018).*

Inter-Core Cooperative TLB Prefetchers for Chip Multiprocessors by Bhattacharjee (Year: 2010).*

Scalable Distributed Last-Level TLBs Using Low-Latency Interconnects; by Bharadwaj; Oct. 2018 (Year: 2018).*

Process-in-Process: Techniques for Practical Address-Space Sharing by Hori (Year: 2018).*

Low-Synchronization Translation Lookaside Buffer Consistency in Large-Scale Shared-Memory Multiprocessors by Rosenburg (Year: 1989).*

* cited by examiner

APPARATUS AND METHOD

This application claims priority to EP Patent Application No. 19386010.3 filed 12 Mar. 2019, the entire contents of which are hereby incorporated by reference.

BACKGROUND

This disclosure relates to apparatus and methods.

Systems of multiple processing elements are known in which each processing element has a respective translation lookaside buffer (TLB) to store address translation data.

It is also known to allow for processing task migration or spawning between processing elements of a multiple processing element system.

SUMMARY

In an example arrangement there is provided apparatus comprising:

two or more processing devices each having an associated translation lookaside buffer to store translation data defining address translations between virtual and physical memory addresses, each address translation being associated with a respective virtual address space; and control circuitry to control the transfer of at least a subset of the translation data from the translation lookaside buffer associated with a first processing device to the translation lookaside buffer associated with a second, different, processing device.

In another example arrangement there is provided apparatus comprising:

two or more processing means each having an associated translation lookaside buffer means for storing translation data defining address translations between virtual and physical memory addresses, each address translation being associated with a respective virtual address space; and means for controlling the transfer of at least a subset of the translation data from the translation lookaside buffer means associated with a first processing means to the translation lookaside buffer means associated with a second, different, processing means.

In another example arrangement there is provided a method comprising:

storing translation data defining address translations between virtual and physical memory addresses, each address translation being associated with a respective virtual address space, in respective translation lookaside buffers associated with two or more processing devices; and controlling the transfer of at least a subset of the translation data from the translation lookaside buffer associated with a first processing device to the translation lookaside buffer associated with a second, different, processing device.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
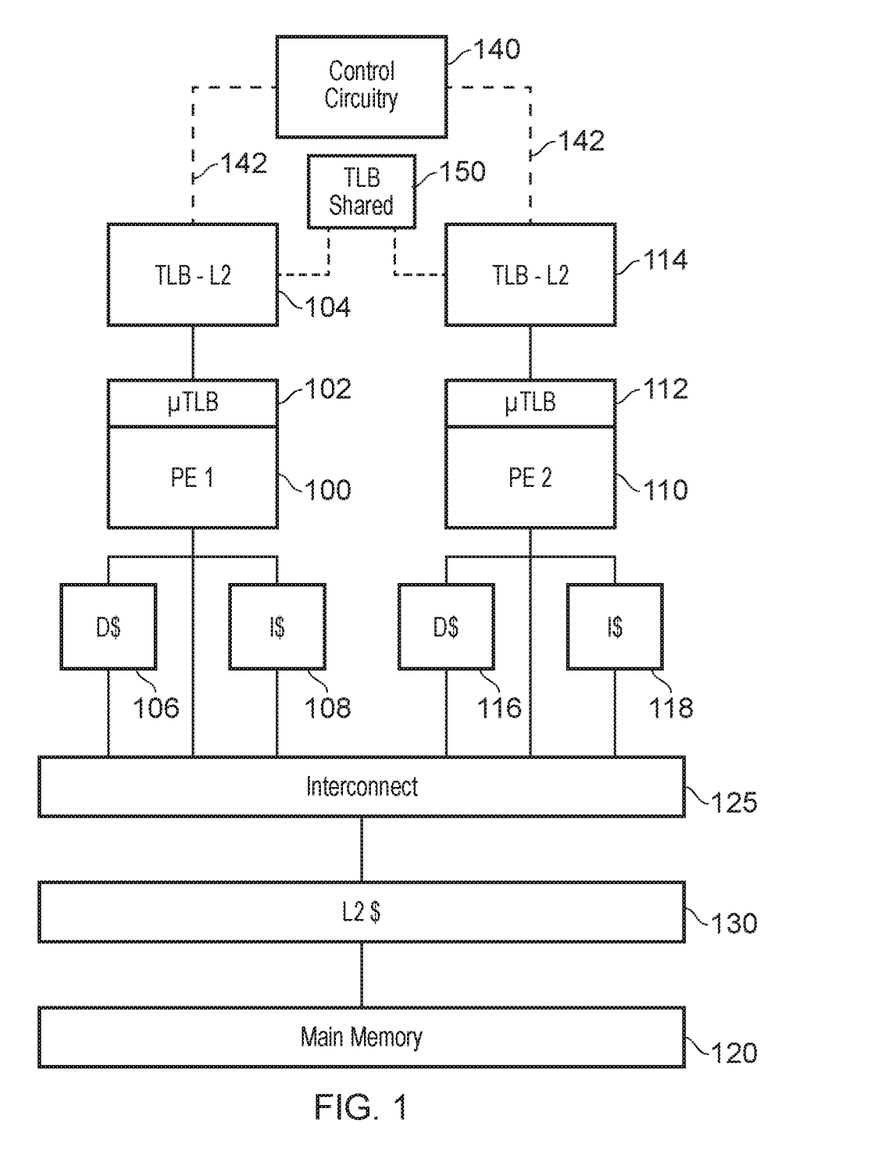
FIG. 1 schematically illustrates a data processing apparatus.

Referring now to the drawings, FIG. 1 schematically illustrates data processing circuitry or apparatus 105 in which program instructions are executed by two or more processing elements 100, 110. Note that only two processing elements are shown in FIG. 1 but that the present techniques could be applicable to any number of (two or more) processing elements.

Each processing element has an associated micro translation lookaside buffer (μTLB) 102, 112 which cooperates with a respective level 2 TLB 104, 114 to provide information to the processing element relating to translations between virtual addresses and physical addresses. In particular, virtual addresses may form part of a virtual address space in use for the execution of a particular processing task and identified by a so-called ASID (application space identifier), whereas the physical addresses indicate physical locations in a memory 120.

As part of its processing operation, each processing element accesses memory locations according to their virtual address. The virtual memory address is translated using a translation provided by the μTLB (possibly in turn retrieving cached translation information from the level 2 TLB) into physical addresses to access the information in the memory 120, a level 2 cache 130 or a respective data cache (D$) 106, 116 or instruction cache (I$) 108, 118. Optionally, interconnect circuitry 125 connected to the first and second processing devices may be provided.

Although there is nothing to stop two ASIDs employing the same address translations, this would negate any advantage (for example relating to isolation or security between different processing tasks) of using separate ASIDs. So generally speaking, each virtual address space (associated with a respective ASID) will have an associated set of address translations, and these will generally differ from ASID to ASID. The translations are identified in the TLB structure by their ASID, so that translations applicable to one ASID are not used in connection with another ASID.

Control circuitry 140, providing a communication path (or at least coordinating the provision of such a path between the TLBs associated with the respective processing elements is also shown in FIG. 1. The purpose and operation of the control circuitry 140 will be discussed below. Note that the control circuitry could be implemented as one or more of the following example arrangements:

circuitry separate to the processing elements 100, 110 which provides one or both of a control function and a transfer path;

a part of the functionality of one or more of the processing elements 100, 110, for example under program instruction and/or operating system control;

an interface to one or more of a higher level shared TLB (to be discussed below) and/or the interconnect 125.

In the present embodiments, it is noted that processing tasks can be migrated between processing elements. This can occur for various reasons, particularly (though not exclusively) in a so-called heterogeneous processing system, in which the processing elements 100, 110 have different properties such as those discussed below.

For example, in a system of heterogeneous processing elements, one (or a subset) of the processing elements may be more powerful than another (or another subset) of the processing elements, for example by virtue of having a different architecture, and/or by providing support circuitry such as a co-processor. Or the processing elements may differ in that one or a subset is a so-called out of order processor and another or another subset is an in order processor. But even in a homogeneous system, the processing elements may be configurable to have different performance, for example by currently running at a higher voltage and/or clock speed, or the like. In any of these arrangements, it can be useful to allocate a more demanding task for execution by a more powerful processing element and to relegate a less demanding task for execution by a less powerful processing element. Given that the demands placed on the system by any particular task can vary with time, this can also lead to the need to migrate tasks between processing elements from time to time.

Another example, applicable to heterogeneous and homogenous systems, is to migrate processing tasks so as to achieve improved load balancing so that the various processing elements are more evenly loaded, but other reasons can include thermal balancing so that heat generation is evenly provided across an integrated substrate carrying several processing elements.

However, the TLB arrangements 102, 104, 112, 114 in the circuitry of FIG. 1 are processing element-specific and are also populated (for example from so-called page tables held in memory) during the execution of a processing task. For example, if, during execution of a processing task, a TLB "miss" occurs so that a required translation is not currently held by either the μTLB (and cannot be pulled from the level 2 TLB) corresponding to a processing element, a process such as a so-called page table walk (PTW) may be undertaken in order to obtain the required translation from memory and store it in the μTLB and/or the level 2 TLB for future use.

Such PTW processing is time-consuming and can in some examples take many hundreds or thousands of clock cycles. The effect of populating the TLBs in this way is that after a period of executing a particular processing task having an associated task ASID, a set of relevant and/or useful translations are held by the TLB structure associated with the processing element executing that task. When the task is migrated to another processing element, in the absence of any other measures such as techniques to be discussed below, the TLB structure associated with the newly allocated processing element will not contain the useful and relevant translations for that processing task and the PTW process will have to be repeated in order to populate the TLB structure of the newly allocated processing element. Note that the page table(s) applicable to a PTW process for a particular ASID are identified by a location in memory defined by a page table base register (PTBR); the PTBR is updated whenever a change of ASID is implemented.

To alleviate this issue, in example embodiments of the present disclosure, the control circuitry 140 controls (performs, oversees the performance of, or the like) the transfer of TLB data from the TLB of a first processing element to the TLB of a second processing element which has started, or is about to start, or is predicted to start, execution of a task for which the transferred TLB data will be relevant. Example arrangements by which this is performed will be discussed below.

FIG. 1 therefore provides an example of apparatus 105 comprising: two or more processing devices 100, 110 each having an associated translation lookaside buffer 102, 104; 112, 114 to store translation data defining address translations between virtual and physical memory addresses, each address translation being associated with a respective virtual address space; and control circuitry 140 to control the transfer of at least a subset of the translation data from the translation lookaside buffer associated with a first processing device to the translation lookaside buffer associated with a second, different, processing device. In general terms the control circuitry is configured to control the transfer of translation data relating to the virtual address space associated with a given processing task, which is being, or has been, executed by the first (source) processing device and is associated with the same virtual address space (for example, the same ASID) as a task that is being, or is to be, or is predicted to be, executed by the second (target) processing device.

Various techniques to achieve the transfer will be discussed below. In some examples the control circuitry is configured to control the transfer of at least the subset of the translation data in response to initiation of execution by the second processing device of a processing task in a virtual address space associated with a given processing task executed by the first processing device prior to the transfer (which term encompasses either the situation that the first processing device has finished executing the given task, or that the first processing device is still executing the given task). This situation may be detected by the first processing device, the second processing device and/or the control circuitry. For example, the given processing task may be a processing task most recently executed by the first processing device (which once again does not exclude the possibility that the execution may be ongoing at the first processing device); and a processing task currently executed by the first processing device.

Note that a particular task could be transferred or migrated from the first processing device to the second processing device. In other examples, a so-called spawning process could take places so that a task executing on the first processing device with a particular ASID spawns a "child" task for execution on the second processing device using the same ASID. In this latter case the task executing on the first processing device may terminate or may continue. But in general, the task on the second processing device does not have to be the same task as that which has executed on the first processing device; what is significant is that the virtual address spaces (for example, the ASIDs) are the same so that the TLB data to be transferred from the TLB of the first processing device to the TLB of the second processing device is likely to be useful and relevant to execution at the second processing device.

In other examples, the apparatus (for example, the control circuitry, the first processing device and/or the second processing device) is configured to generate a prediction of initiation of execution by the second processing device of a processing task in a virtual address space associated with a given processing task executed by the first processing device prior to the transfer, and to control the transfer of at least the subset of the translation data in response to the prediction.

Figure 2:
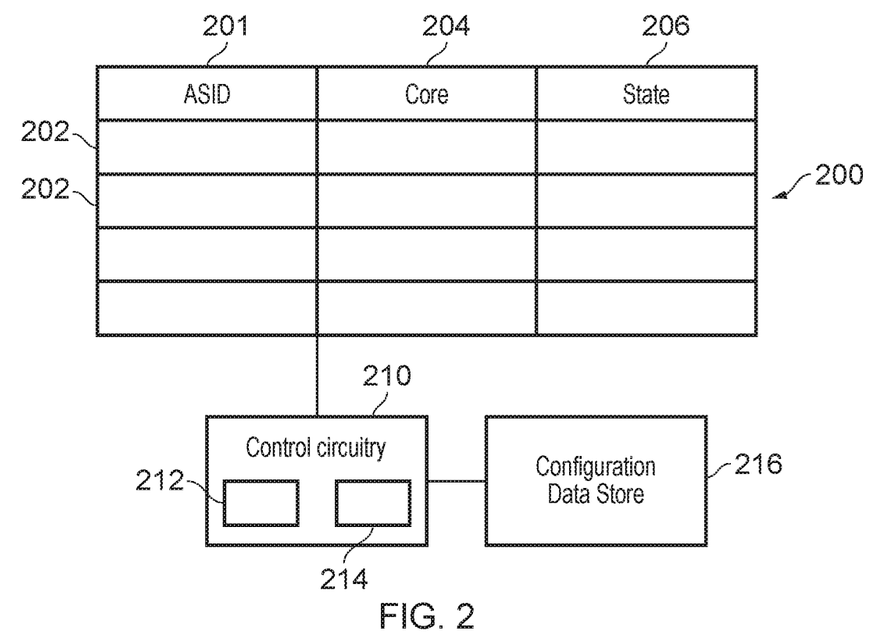
FIG. 2 schematically illustrates a migration tracking table.

FIG. 2 schematically illustrates a so-called migration tracking table 200 (which may be stored in the memory 120 or in dedicated storage specifically associated with the control circuitry 140) and an associated control circuitry 210 (as an example of the control circuitry 140) for use in at least some example embodiments discussed below.

The table 200 stores entries 202 linking an ASID 201 to an identifier 204 of a particular processing element or core and an associated state 206. Two example (and similar) ways of controlling the table are that a core or CPU that performs ASID management/switching will use memory requests to update a memory-mapped table; and/or that the (same) core sends a special signal or makes use of memory mapping of the table to the table or the controller of the table notifying it of ASID state updates, and the table self-organises to the extent required.

The state 206 may indicate, for example:
- "active" indicating that the relevant core is currently executing the processing task associated with that ASID;
- "inactive" indicating that the relevant core has stopped executing that processing task but is not currently executing a different processing task; or
- "invalid" indicating that the relevant core is now executing or has since executed a different processing task (in other words, there will be an entry for that core under a different ASID, and this inactive entry is simply an invalidated previous entry which has not yet been overwritten or purged from the table 200).

Note that the association shown in FIG. 2 is with the ASID rather than necessarily having to define a particular processing task, given that if two or more different tasks shared the same ASID, it is considered likely that the translations currently held by the TLB structure associated with the processing element executing tasks under that ASID are relevant to one another. However, in other examples, the association represented in the left hand column of the migration tracking table 200 could be with another type of task identifier.

Therefore, this provides an example in which each virtual address space has an address space identifier (ASID); and the control circuitry 140 is configured to maintain task data (the migration tracking table 200) to indicate address space identifiers of processing tasks executed by the processing devices.

The control circuitry 210 shown in FIG. 2 comprises circuitry 212 configured and operable to perform the transfer of TLB data as discussed here, and optionally detection and/or prediction circuitry 214.

The control circuitry 210 is also configured to access configuration data stored in a configuration data store 216. For example, the configuration data may indicate the physical circuit locations of the various cores, at least in enough detail to establish which of two or more other cores is closest in a physical circuit sense to a given core. For example, the configuration data may represent a set of cores (A . . . J) as a plurality of subgroups, for example [A B C], [D E F], [G H I J], so that a court within the same subgroup as the given core is taken to be closer, in a physical circuit sense, to the given core than a core within a different subgroup. This allows the control circuitry 210, when it identifies more than one processing element having relevant TLB data, to control the transfer of at least a subset of the TLB data from the TLB associated with a physically closest one of the identified processing elements to the TLB associated with the second (target) processing element.

In some example embodiments, the control circuitry 210 itself detects and/or predicts the need to transfer TLB data because of a change in processing core or a spawning of a child process from a currently executing processing core. Such a prediction and/or detection is performed by the circuitry 214. In other examples it is a processing event at either the first (previous or current) or second (about to start processing) processing element which causes the initiation of the transfer of the TLB data. In this case, the prediction and/or detection circuitry 214 is not required at the control circuitry 210, but the circuitry 212 is used, and is responsive to control instructions received from the first and/or second processing elements.

Figure 3:
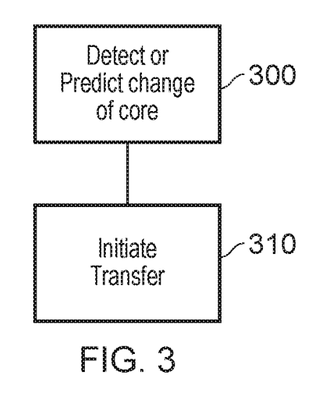
FIGS. 3 to 5 are schematic flowcharts illustrating respective methods.
Figure 4:
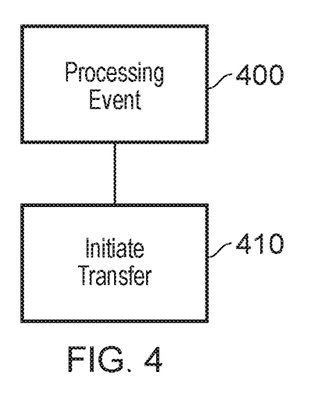

FIGS. 3 and 4 schematically illustrate respective examples of events to initiate a transfer of TLB data from one processing element to another processing element.
Prediction/Detection by the Control Circuitry 210

In FIG. 3, the control circuitry 210 itself detects or predicts, at a step 300, that a particular ASID is already running, or is about to be run, on a different core or processing element to the previous situation.

In terms of detection, the control circuitry 210 (and in particular the circuitry 214) can make such a detection from, for example, a newly entered or newly amended entry 202 in the migration tracking table 200, indicating an ASID newly associated in an active state with a particular core.

In the context of a prediction, it is noted that various ways are envisaged of triggering TLB data migration: (1) a pre-push mechanism that moves entries over before the actual migration takes place, for example by an instruction that allows software to declare to the control logic that a transfer is imminent; (2a) TLB entries are migrated at or shortly after the actual core migration, for example when the destination core switches its running ASID/TTBR (page table base); the prediction aspect here is that the system is predicting that the new thread is a thread from another core (obtained from the table), and TLB entries are migrated over from that core; (2b) similar to 2a, but waiting to move or copy TLB entries until there is actually a TLB miss in the target core.

In response, the control circuitry 210 initiates a transfer of TLB data at a step 310, using techniques to be discussed below.
Prediction/Detection by the First and/or Second Processing Element FIG. 4 shows a similar arrangement, but in terms of actions by one or both of the first and second processing elements.

In FIG. 4, at a step 400, a processing element (which is to say, the first and/or second processing element for example) detects a processing event and in response to the detection, to request (at a step 410) the control circuitry to control (or at least to initiate the control of) the transfer of at least a subset of the translation data from the translation lookaside buffer associated with the first processing device to the translation lookaside buffer associated with the second processing device.

For the second (target) processing element, the processing event may be one of the following events, for example:
- a translation lookaside buffer miss at the second processing device, following initiation of execution of the given processing task to the second processing device. (In such a circumstance, instead of or in addition to executing a PTW process, the second processing element causes (at a step 410) the transfer of TLB data to be initiated);
- a request for the second processing device to start processing of the given processing task, for example by means of a so-called ERET (exception return) instruction transitioning from kernel space to user space);
- execution by the second processing device of a program instruction to request the control circuitry to control the transfer;
- detection of a change in one or more control registers of the second processing device associated with a change in one or both of processing task and virtual address space.

For the first (previous or current) processing element, the processing event may be one of the following events, for example:

execution by the first processing device of a program instruction to request the control circuitry to control the transfer.

Figure 5:
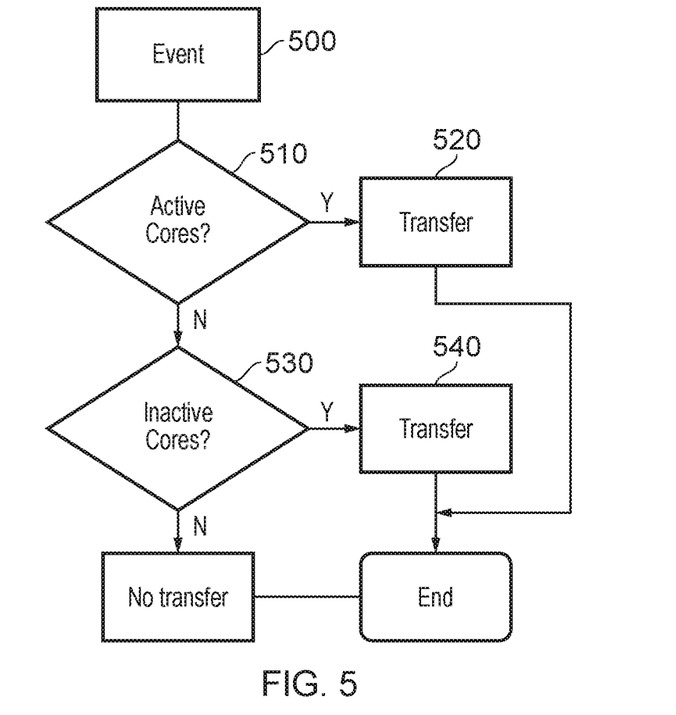

FIG. 5 shows further example operations of the control circuitry 210 in response to an initiating event 500 which could be, for example, represented by either of the steps 310 and 410.

For a particular ASID now being executed by a target processing element or core, or for which execution has been predicted, or for which execution has at least been initiated, the control circuitry 210 checks whether any other processing elements or cores are noted as being "active" in respect of that ASID, 510. If the answer is yes then control passes to a step 520 at which at least some of the TLB information from the currently active other core (s) is transferred to the TLB structure of the newly allocated or target core and the process ends.

If, at the step 510, the outcome is "no" then control passes to a step 530 at which the control circuitry 210 detects whether there are any inactive cores associated with the ASID newly allocated to the target core. If yes, then control passes to a step 540 at which at least some TLB data is transferred from the TLB structure associated with the inactive cores to the TLB structure associated with the target cores, and the process ends.

If, on the other hand, the outcome from the step 530 is "no" then control passes to a step 550 at which no transfer is made and the process ends.

The preference for active cores, then inactive cores, provides an example in which the control circuitry is configured to identify from the task data (the migration tracking table), for the address space identifier of the virtual address space associated with the given processing task, one or more other processing elements which most recently executed the given processing task and to control the transfer of translation data from the translation lookaside buffer associated with one executing the task as a first preference, followed by a second preference of a core which executed the processing task most recently and has not executed another task since then.

As mentioned above, in the case that the control circuitry identifies more than one processing element, the control circuitry is configured to control the transfer of at least a subset of the translation data from the translation lookaside buffer associated with a physically closest one of the identified processing devices to the translation lookaside buffer associated with a second, different, processing device, for example as identified by the configuration data discussed above. In other examples, TLB data for more than one processing element may be transferred, for example in an order of transfer based on physical circuit proximity.

Selection of Data to be Transferred

The control circuitry 140 can select as TLB data to be transferred, at least one or more selected from the list consisting of:
  translation data defining an address translation of a stack pointer address;
  translation data defining an address translation of a program counter address;
  translation data defining an address translation of a link register address; or
  a most-recently used subset of translation data (for example, the 8 most recently used translations) relating to the virtual address space associated with the given processing task.

In some examples, the TLB data can be transferred in an order of use, from most recently used (first) to least recently used (last).

Figure 6:
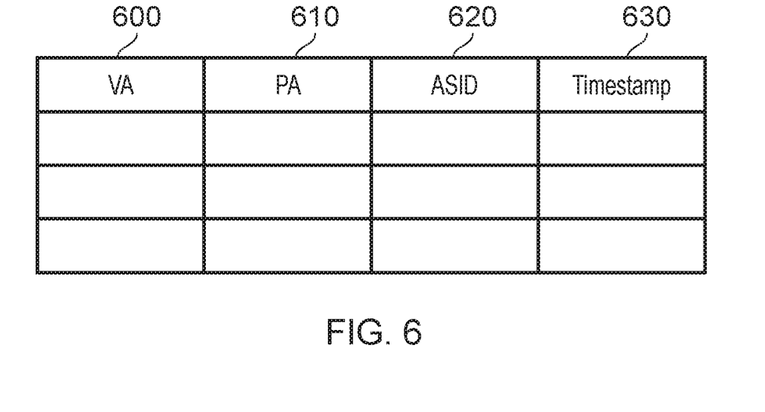
FIG. 6 schematically illustrates a TLB data format.

In order to select TLB data according to whether it is most recently used, a so-called time stamp can be maintained by the relevant TLB. FIG. 6 schematically illustrates at least part of the data stored in a TLB, for example comprising a virtual address or virtual address range 600, a translated physical address or physical address range 610, an ASID 620 applicable to that translation, and a time stamp 630 associated with the translation. In some examples, the timestamp 630 can be updated to a current time whenever the translation is accessed and used.

In other examples, the control circuitry 140 can select as a subset of the translation data comprises all translation data held by the translation lookaside buffer of the first processing device relating to the virtual address space associated with the given processing task.

Data Transfer Path

The transfer of TLB data may be achieved by the control circuitry 140 by a direct path 142 via the control circuitry, which may be for example between the L2 TLBs, the µTLBs or both.

In other examples, the control circuitry can control the transfer of the translation data via the interconnect circuitry.

In other examples, the system has a hierarchy of translation lookaside buffer storage including the respective translation lookaside buffers (such as the L2 TLBs and the µTLBs discussed above) associated with each processing device and a higher level (for example, L3) translation lookaside buffer 150 (FIG. 1) shared between two or more processing devices, the control circuitry being configured to control the transfer of the translation data via the higher level translation lookaside buffer. In other examples, the transfer can be via a shared L2 TLB, not shown in FIG. 1 but functionally taking the place of the individual L2 TLBs 104, 114.

Figure 7:
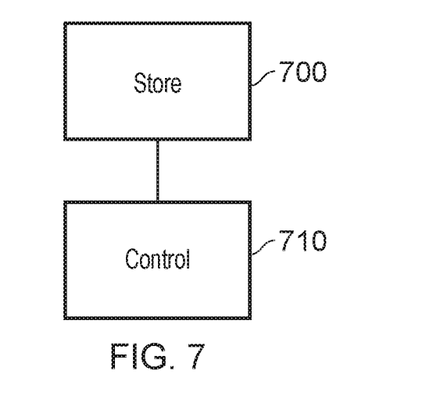
FIG. 7 is a schematic flowchart illustrating a method.

Finally, by way of summary, FIG. 7 is a schematic flowchart illustrating a method comprising:
  storing (at a step 700) translation data defining address translations between virtual and physical memory addresses, each address translation being associated with a respective virtual address space, in respective translation lookaside buffers associated with two or more processing devices; and
  controlling (at a step 710) the transfer of at least a subset of the translation data from the translation lookaside buffer associated with a first processing device to the translation lookaside buffer associated with a second, different, processing device.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
two or more processing devices each having a translation lookaside buffer to store translation data defining address translations between virtual and physical memory addresses, each address translation being associated with a respective virtual address space, wherein:
the translation lookaside buffer of a first processing device is more closely associated with the first processing device than a second, different, processing device; and
the translation lookaside buffer of the second processing device is more closely associated with the second processing device than the first processing device, and
control circuitry to:
control a direct transfer of at least a subset of the translation data from the translation lookaside buffer of the first processing device directly to the translation lookaside buffer of the second processing device; and
control the direct transfer of at least the subset of the translation data in response to initiation of execution by the second, different processing device of a processing task in a virtual address space, the virtual address space being associated with a given processing task executed by the first processing device prior to the transfer,
wherein the processing task executed by the second, different processing device is a migration of the given processing task executed by the first processing device or is a child task of the given processing task executed by the first processing device.

2. Apparatus according to claim 1, in which the given processing task is selected from the list consisting of:
a processing task most recently executed by the first processing device; and
a processing task currently executed by the first processing device.

3. Apparatus according to claim 1, in which the apparatus is configured to generate a prediction of initiation of execution by the second processing device of a processing task in a virtual address space associated with a given processing task executed by the first processing device prior to the direct transfer, and to control the direct transfer of at least the subset of the translation data in response to the prediction.

4. Apparatus according to claim 1, in which:
the control circuitry is configured to control the direct transfer of translation data relating to the virtual address space associated with the given processing task.

5. Apparatus according to claim 1, in which:
each virtual address space has an address space identifier; and
the control circuitry is configured to maintain task data to indicate address space identifiers of processing tasks executed by the processing devices.

6. Apparatus according to claim 5, in which the control circuitry is configured to identify from the task data, for the address space identifier of the virtual address space associated with the given processing task, one or more other processing elements which most recently executed the given processing task and to control the direct transfer of translation data from the translation lookaside buffer associated with one of the identified processing elements.

7. Apparatus according to claim 6, in which, when the control circuitry identifies more than one processing element, the control circuitry is configured to control the direct transfer of at least a subset of the translation data from the translation lookaside buffer of a physically closest one of the identified processing devices to the translation lookaside buffer of a second, different, processing device.

8. Apparatus according to claim 1, in which the second processing device is configured to detect a processing event and in response to the detection, to request the control circuitry to control the direct transfer of at least a subset of the translation data from the translation lookaside buffer of the first processing device to the translation lookaside buffer of the second processing device.

9. Apparatus according to claim 8, in which the processing event is an event selected from the list consisting of:
a translation lookaside buffer miss at the second processing device, following initiation of execution of the given processing task to the second processing device;
a request for the second processing device to start processing of the given processing task;
execution by the second processing device of a program instruction to request the control circuitry to control the direct transfer; and
detection of a change in one or more control registers of the second processing device associated with a change in one or both of processing task and virtual address space.

10. Apparatus according to claim 1, in which the first processing device is configured to detect a processing event and in response to the detection, to request the control circuitry to control the direct transfer of at least a subset of the translation data from the translation lookaside buffer of the first processing device to the translation lookaside buffer of the second processing device.

11. Apparatus according to claim 10, in which the processing event comprises execution by the first processing device of a program instruction to request the control circuitry to control the direct transfer.

12. Apparatus according to claim 1, in which the subset of the translation data comprises at least one or more selected from the list consisting of:
translation data defining an address translation of a stack pointer address;
translation data defining an address translation of a program counter address;
translation data defining an address translation of a link register address; and
a most-recently used subset of translation data relating to the virtual address space associated with the given processing task.

13. Apparatus according to claim 1, in which the subset of the translation data comprises all translation data held by the translation lookaside buffer of the first processing device relating to the virtual address space associated with the given processing task.

14. Apparatus according to claim 1, comprising interconnect circuitry connected to the first and second processing devices, the control circuitry being configured to control the direct transfer of the translation data via the interconnect circuitry.

15. Apparatus according to claim 1, comprising a hierarchy of translation lookaside buffer storage including the respective translation lookaside buffers of each processing device and a higher level translations lookaside buffer further from each processing device than said respective translation lookaside buffers and shared between two or more processing devices, the control circuitry being configured to control the transfer of the translation data via the higher level translation lookaside buffer.

16. Apparatus comprising:
   two or more processing means each having a translation lookaside buffer means for storing translation data defining address translations between virtual and physical memory addresses, each address translation being associated with a respective virtual address space, wherein:
      the translation lookaside buffer of a first processing means is more closely associated with the first processing means than a second, different, processing means; and
      the translation lookaside buffer of the second processing means is more closely associated with the second processing means than the first processing means,
   means for controlling a direct transfer of at least a subset of the translation data from the translation lookaside buffer means of the first processing means directly to the translation lookaside buffer means of the second processing means; and
   means for controlling the direct transfer of at least the subset of the translation data in response to initiation of execution by the second, different processing means of a processing task in a virtual address space, the virtual address space being associated with a given processing task executed by the first processing means prior to the direct transfer,
   wherein the processing task executed by the second, different processing device is a migration of the given processing task executed by the first processing device or is a child task of the given processing task executed by the first processing device.

17. A method comprising:
   storing translation data defining address translations between virtual and physical memory addresses, each address translation being associated with a respective virtual address space, in respective translation lookaside buffers of two or more processing devices, wherein:
      the translation lookaside buffer of a first processing device is more closely associated with the first processing device than a second, different, processing device; and
      the translation lookaside buffer of the second processing device is more closely associated with the second processing device than the first processing device,
   controlling a direct transfer of at least a subset of the translation data from the translation lookaside buffer of the first processing device directly to the translation lookaside buffer of the second processing device; and
   controlling the direct transfer of at least the subset of the translation data in response to initiation of execution by the second, different processor of a processing task in a virtual address space, the virtual address space being associated with a given processing task executed by the first processor prior to the direct transfer,
   wherein the processing task executed by the second, different processing device is a migration of the given processing task executed by the first processing device or is a child task of the given processing task executed by the first processing device.

* * * * *